United States Patent Office 3,098,194
Patented July 16, 1963

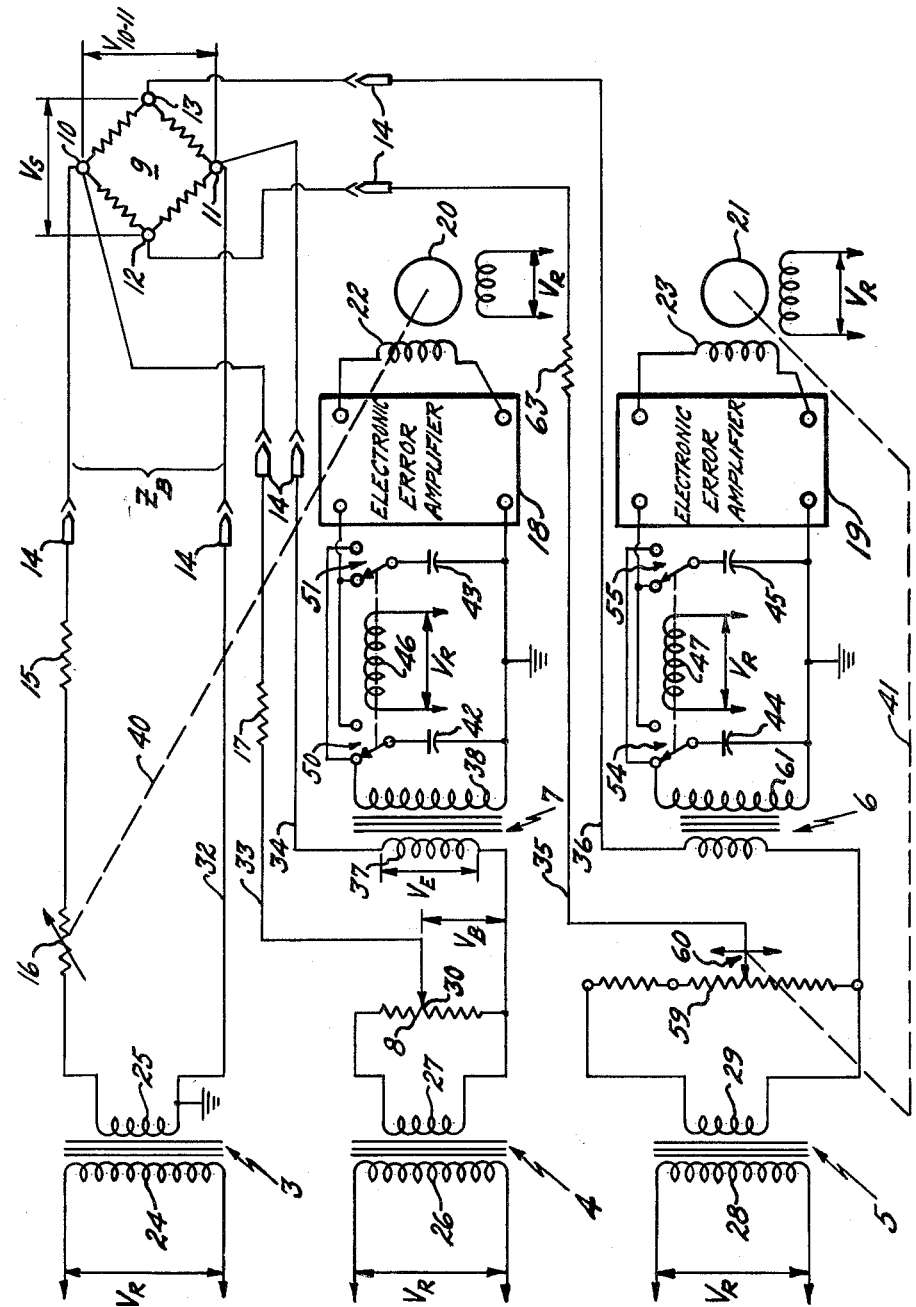

3,098,194
AUTOMATIC A.-C. VOLTAGE RATIO
CONTROLLER
Pat L. Clemens, Tullahoma, Tenn., assignor to the United States of America as represented by the Secretary of the Air Force
Filed Oct. 16, 1961, Ser. No. 145,518
2 Claims. (Cl. 323—66)

This invention relates to a means for making measurements of variable electrical or mechanical parameters using a remotely located transducing element and more specifically to the acquiring of measurements having an extremely high degree of precision through the application of the novel automatic voltage ratio correction means in combination with phase selection means whereby such measurements are unaffected by changes in resistance of interconnecting cables and changes in transducer input and output impedance.

Measurements which are made through a remotely located transducer are accurate only if the input voltage, as it is applied to the transducer bridge, is in constant ratio to a selected reference voltage. The constancy of the ratio of transducer bridge input voltage to reference voltage in conventional measuring systems is frequently affected by changes in the length, gage, temperature and connection resistance of the interconnecting cable. Changes in transducer bridge input and output impedance due to environmental changes are also a serious source of error. Further variations are introduced in prior art systems by the presence of transient voltages and other voltages foreign to the selected reference and input voltages.

It is a common practice in the art, in order to eliminate the undesirable effects of the aforementioned variable parameters, to use identical or the selfsame cable and connecting devices during the collection of data as are used during transducer calibration. The cumbersome and expensive method of monitoring the transducer input voltage during transducer calibration as well as during data collection represents another attempted solution of the problem. A third and equally ineffective method of attempting to provide a constant transducer bridge input voltage consists of manual regulation of any changes in the voltage appearing at the transducer bridge input terminals. The existence of the above enumerated error sources has been a vexing problem in the servo mechanism and data collection fields for which, to date, no really satisfactory solution has been found.

Accordingly, a principal object of my invention is to provide an automatic voltage ratio controller which will eliminate the aforementioned ineffective methods of error compensation.

It is a further object of my invention to provide a means for making measurements through a remotely located transducing element, which means is unaffected by changes in the connecting cable resistance.

It is a further object of my invention to provide a means for making measurements through a remotely located transducing element which means is unaffected by changes in either transducer input or output impedance.

It is a further object of my invention to provide a measuring system for making measurements through a remotely located transducer, the operation of which system is independent of the presence of transients and other voltages foreign to the selected reference and input voltages.

It is a further object of my invention to provide a measuring system for making measurements through a remotely located transducer which eliminates the need for calibration and measurement with identical or the selfsame cable and connectors.

It is a further object of my invention to provide a measuring system for making measurements through a remotely located transducer including an automatic voltage ratio controller in combination with phase selection means whereby measurements of greater precision and accuracy than have heretofore been possible may be obtained.

The above and other objects of my invention will be apparent to those of ordinary skill in the art to which my invention pertains from the following description and drawing, in which:

The accompanying drawing is a diagrammatic representation of a phase selective A.C. voltage ratio controller incorporating the principles of the subject invention.

Referring now to said drawing, transducer bridge 9 is shown located remotely from its associated circuitry through disconnecting means 14. Power terminals 10 and 11 of transducer bridge 9 are excited by voltage $V_{10-11}$ which is supplied by the secondary of transformer 3. A reference voltage $V_R$ is applied to the primary windings of transformers 3, 4, and 5 and motors 20 and 21 and is supplied by a regulating transformer (not shown) capable of providing an alternating current output regulated to approximately one percent accuracy over the normal operating range of supply voltage.

The ratio of voltage $V_{10-11}$ to the reference voltage $V_R$ is determined by the turns ratio of transformer 3, the resistance value of series voltage adjusting resistor 16, the cabling and connector resistance values which are illustrated as one lumped resistance 15 and the input impedance $Z_B$ of transducer bridge 9. The turns ratio of transformer 3 is a fixed value while lumped cabling resistance 15 is subject to change with connector contact resistance change, room temperature change, change in cable length or change in wire gage. The transducer bridge input impedance $Z_B$ is also a variable quantity subject to any change in temperature to which transducer bridge 9 is subjected. The remaining variable element affecting the ratio of voltage $V_{10-11}$ to voltage $V_R$, series voltage adjusting resistor 16, may therefore be varied in such a manner as to cancel out any net voltage change at power terminals 10, 11 thereby maintaining the desired constant voltage ratio.

The novel and unique means for monitoring said voltage ratio and for automatically varying adjusting resistor 16 in response to any changes in said voltage ratio is a fundamental element of my invention and insures a constant ratio of transducer bridge input voltage to reference voltage and consequently provides a high degree of accuracy and precision in measurements taken therefrom.

Referring once again to said drawing it is shown that a transducer input reference voltage $V_B$ is provided, which voltage is a function of system reference voltage $V_R$, the turns ratio of transformer 4 and the setting of slider 30 along voltage adjusting resistor 8. The turns ratio of transformer 4 being constant, the ratio of second reference voltage $V_B$ to system reference voltage $V_R$ is seen to be dependent only upon the setting of slider 30. The setting of said slider 30 is made such that transducer input reference voltage $V_B$ is equal to the desired transducer input voltage $V_{10-11}$. Once slider 30 has been set the ratio of transducer input reference voltage $V_B$ to system reference voltage $V_R$ becomes a fixed value.

Cables 33, 34 interconnect transducer bridge input voltage $V_{10-11}$, input reference voltage $V_B$ and the primary coil 37 of transformer 7 in a series arrangement. An error voltage $V_E$ will appear across primary coil 37 of transformer 7 if transducer bridge input voltage $V_{10-11}$ differs from transducer input reference voltage $V_B$. It is apparent that error voltage $V_E$ will be equal to the algebraic difference between transducer bridge input voltage $V_{10-11}$ and transducer input reference voltage $V_B$, and will have a finite value only when said transducer bridge input voltage $V_{10-11}$ departs from the preset value of said transducer input reference voltage $V_B$. A departure of transducer bridge input voltage $V_{10-11}$ from transducer input reference voltage $V_B$ results in a value of error voltage $V_E$ equal in magnitude to the difference therebetween. Upon amplification by error amplifier 18 said error voltage $V_E$ operates motor 20 in such a direction as to vary adjusting resistor 16, through mechanical actuating means 40, so as to cause transducer bridge input voltage $V_{10-11}$ to approach transducer input reference voltage $V_B$. A novel error correcting loop is thus provided whereby error voltage $V_E$ is continually maintained at null and the condition for constant transducer bridge input voltage to system reference voltage ratio is satisfied.

The operation of the phase selecting circuit insures that all phase components of voltage save one are ignored in both correction of the transducer's supply voltage and in measurement of the transducer bridge output voltage. In operation the output of secondary 38 of transformer 7 is sampled by transfer capacitors 42, 43 just when the quadrature voltage passes through zero by properly phasing synchronous switch 46 with reference voltage $V_R$. Since contacts 50, 51 break at the positive and negative peaks of the desired component, this component is transferred to electronic error amplifier means 18. Because of the sampling technique, electronic error amplifier means 18 receives a signal which is single-valued and of alternating polarity.

The transducer bridge output voltage $V_S$ is then measured by the servo potentiometer circuit illustrated in the accompanying drawing which comprises cables 35, 36, transformer 5, potentiometer 59, indicator 60, transformer 6, electronic error amplifier means 19, motor 21, mechanical actuating means 41 and a phase selecting circuit which includes synchronous switch 47, capacitors 44, 45 and contacts 54, 55. The last named phase selecting circuit is identical in its operation to the phase selecting circuit described in conjunction with the error correcting loop. Any transducer bridge output voltage $V_S$ which differs from the value appearing across potentiometer 59 will induce a difference voltage across secondary 61 of transformer 6 which difference voltage is amplified by electronic error amplifier means 19 and applied to coil 23 of motor 21, causing said motor 21 to adjust potentiometer 59 and establish a null condition in the loop while simultaneously positioning indicator 60 to correspond with said transducer bridge output voltage $V_S$. Electronic error amplifier means 18 and 19 each comprise a sufficient number of stages of amplification to actuate motors 20 and 21 in accordance with the above described system operation.

The lumped cabling resistances 17 and 63 are each located in nulling circuits which, at balance, carry no current. Said resistances 17 and 63 are also substantially lower in value than the input impedances of the transformers associated with the error detecting circuit of each, therefore the effect of said resistances 17 and 63 may be ignored.

Having thus described the invention it will be apparent to those of ordinary skill in the art to which it pertains that various modifications and changes may be made in the illustrated embodiment without departing from either the spirit or the scope of the invention.

What is claimed is:

1. An automatic alternating current voltage ratio control system particularly adapted to servo devices for maintaining a constant ratio between servo system reference voltage and transducer input voltage comprising means for providing an input reference voltage, said input reference voltage being equal to the desired transducer input voltage, means for comparing said input reference voltage with the transducer input voltage, means for generating an error signal responsive to the difference between said input voltage and said input reference voltage, and phase selecting means for obtaining a single valued component of said error signal, said phase selecting means comprising a switch operative to open at the positive and negative peaks of the desired component of said error signal.

2. Apparatus as described in claim 1 wherein said phase selecting means comprises a synchronous switch, said synchronous switch being synchronized to open at the positive and negative peaks of the desired component of said error signal in combination with capacitor means, said capacitor means being adapted to sample the desired component of said error signal and transfer said sampled component to said means for adjusting said input voltage.

References Cited in the file of this patent
UNITED STATES PATENTS

| | | |
|---|---|---|
| 2,680,221 | Gilbert | June 1, 1954 |
| 2,974,271 | Guth et al. | Mar. 7, 1961 |